Figure 1:
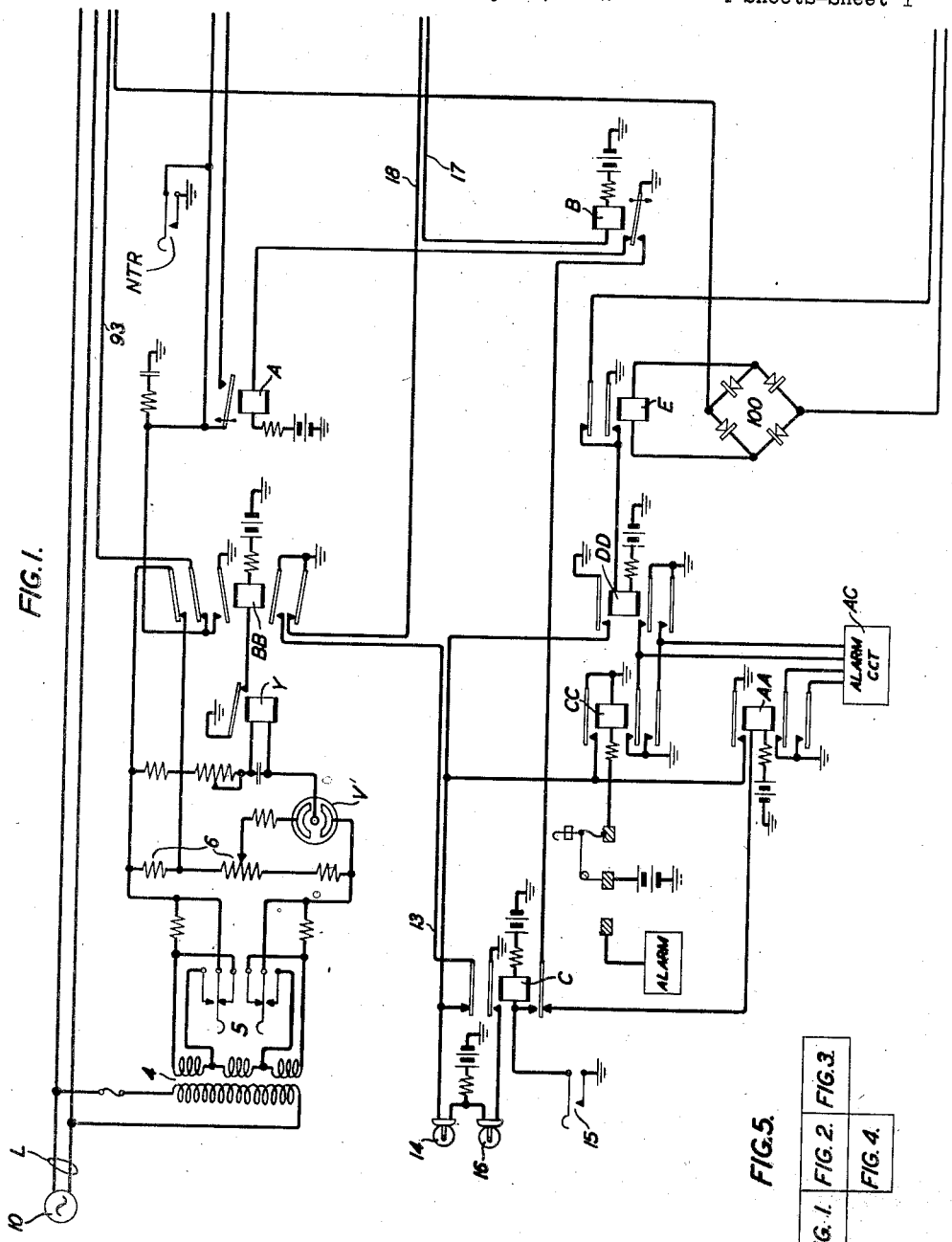
Figure 2:
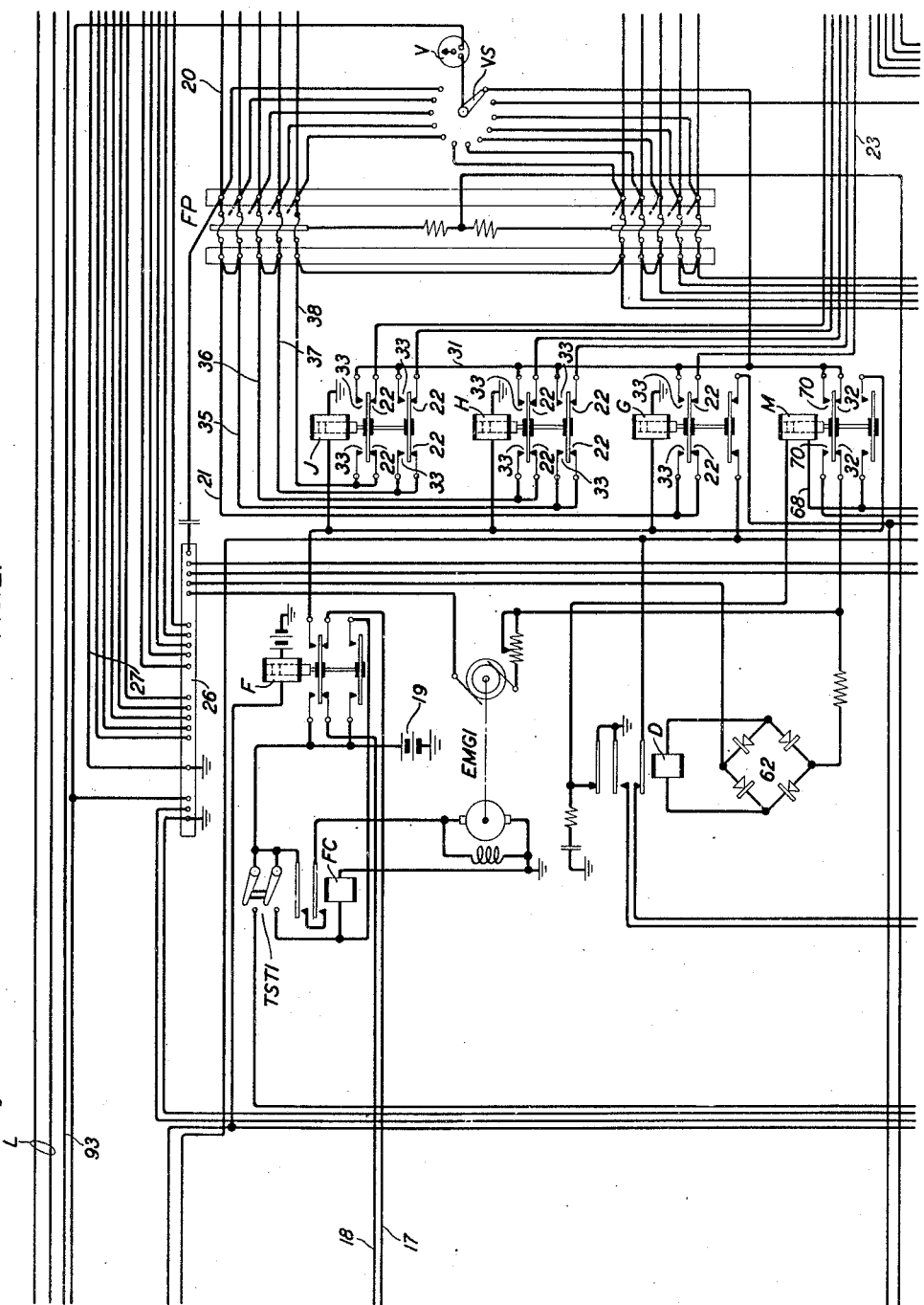

Sept. 7, 1943.　　　H. H. SPENCER　　　2,329,010
POWER SUPPLY SYSTEM
Filed July 22, 1942　　　4 Sheets-Sheet 2

INVENTOR
H. H. SPENCER
BY:
ATTORNEY

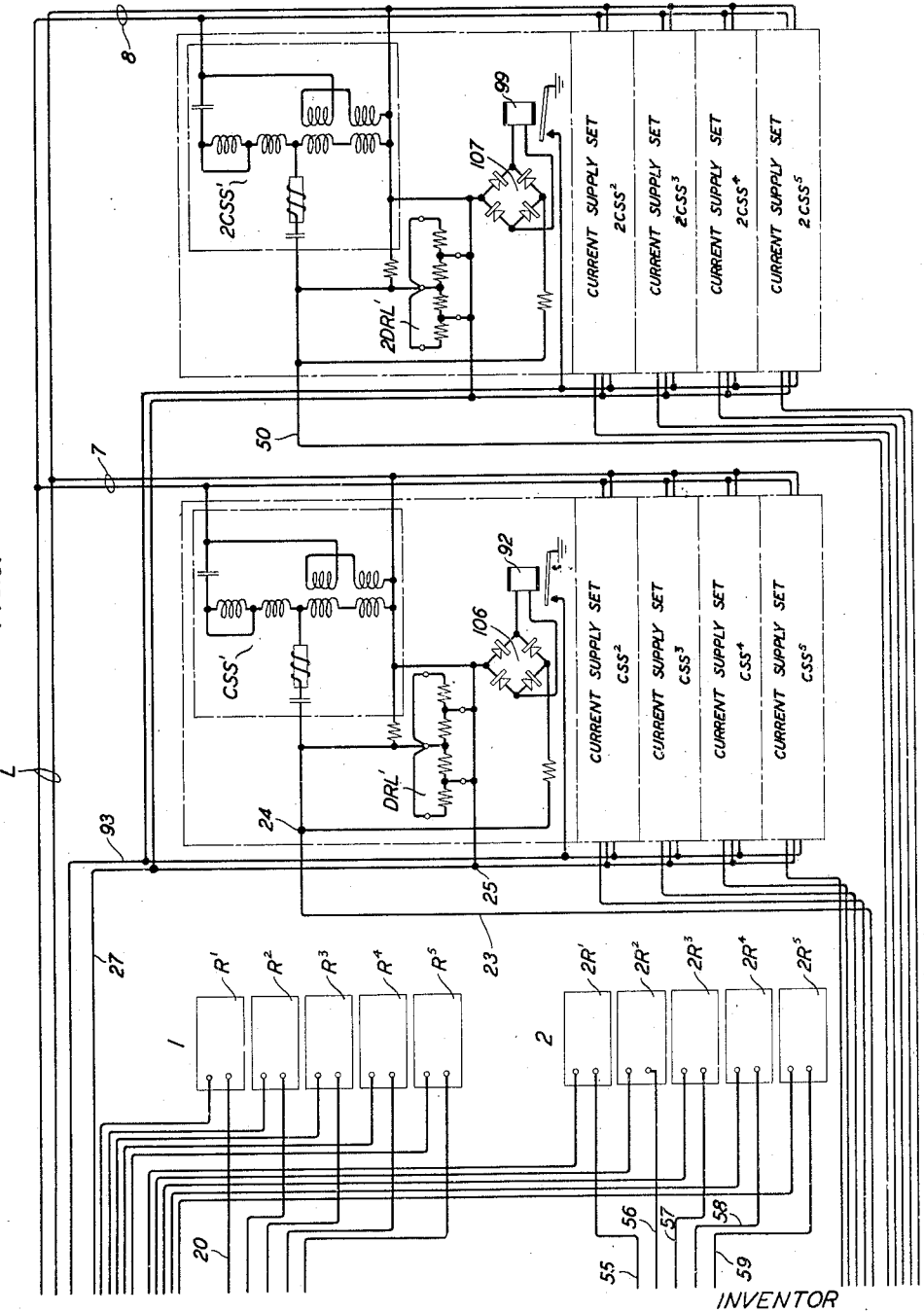

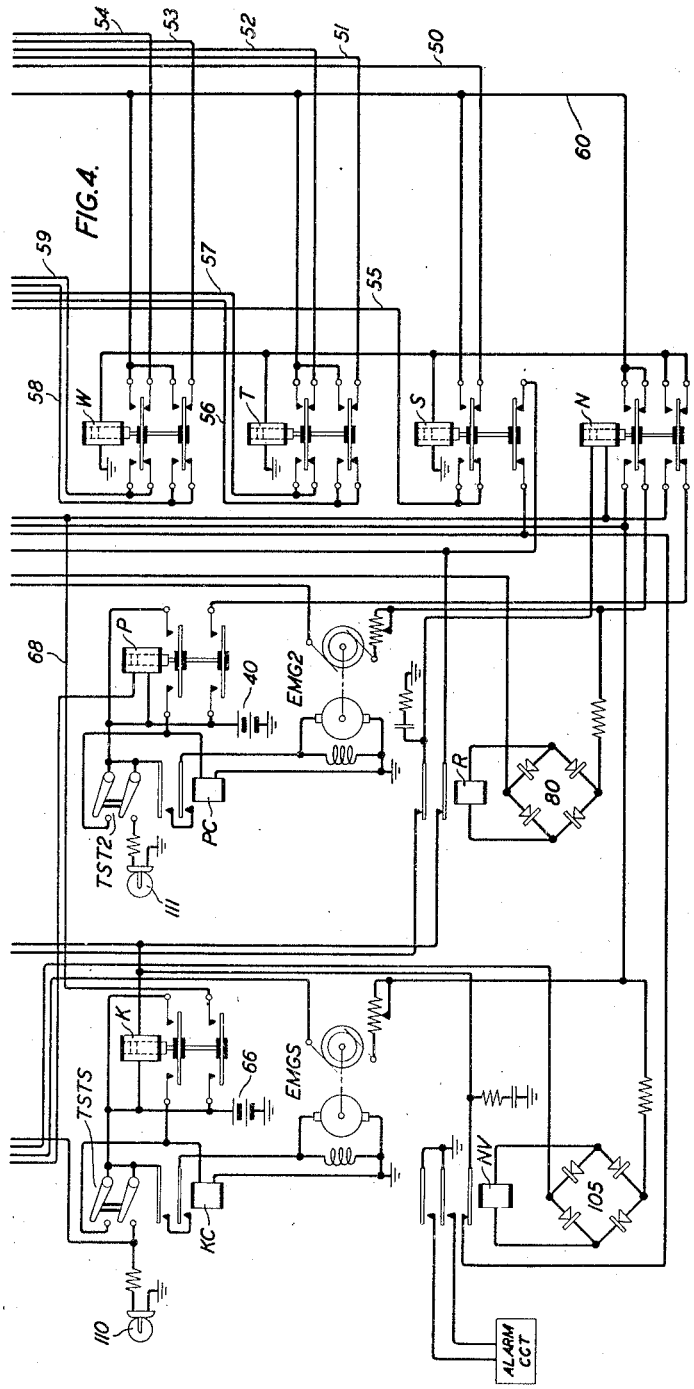

Patented Sept. 7, 1943

2,329,010

UNITED STATES PATENT OFFICE 2,329,010

POWER SUPPLY SYSTEM

Harry H. Spencer, Springfield, N. J., assignor to Bell Telephone Laboratories, Incorporated, New York, N. Y., a corporation of New York Application July 22, 1942, Serial No. 451,854

13 Claims. (Cl. 171—97)

This invention relates to power supply systems and particularly to an automatically controlled power plant of the type which functions to maintain an uninterrupted power supply at a station at which the commercial power service available is subject to failures, or voltage fluctuations in excess of predetermined magnitudes.

Long distance telephone communication systems such as carrier telephone systems, require repeater stations at more or less regular intervals throughout their length to provide the necessary amplification of the signal carrying currents. The filament supply for such amplifiers is, in general, derived from a local commercial service which furnishes alternating current at a predetermined nominal voltage in the neighborhood of 115 volts. Such commercial power services are subject to interruptions and voltage variations of such nature as to preclude the possibility of complete reliance being placed in such services.

It is the object of this invention to provide an improved power plant which functions, upon failure of the local commercial power supply, or upon a reduction in the terminal voltage thereof beyond predetermined limits, to automatically transfer the load from the commercial power service to emergency converters, and to automatically transfer a portion of the load to a standby converter in the event of failure of any of the emergency converters.

In accordance with a feature of the invention a load, comprising the filaments of a plurality of groups of repeaters is normally supplied with power from a local commercial power service through the medium of a regulating step-down transformer, which functions to reduce the supply voltage to a value consistent with satisfactory operation of the filaments and, upon failure of the commercial power service, each load group is automatically transferred from the commercial power service to a separate emergency source of supply.

Another feature contemplates the transfer of any load group to a standby source of power in the event of failure of the emergency power source to supply its load with voltage within a predetermined period of time.

A further feature of the invention renders the standby power source available to take over the load of any of two emergency power sources when either such source should fail, and precludes the possibility of the standby assuming both loads at the same time.

In accordance with a still further feature of the invention, each load group is subdivided into a plurality of load units each of which is normally supplied with power from a commercial power service by way of a separate current supply set and when any one of the current supply sets should fail to develop voltage of suitable magnitude, the load units of both groups are automatically transferred from the commercial power service to emergency supply sources in such a manner that each group derives its power from a separate emergency source.

Other features include the production of alarm signals to indicate various load transfer and no voltage conditions.

The invention will be readily understood from the following description made with reference to the accompanying drawings, Figs. 1, 2, 3 and 4 of which, when assembled in the manner indicated in Fig. 5, constitute a circuit schematic of a power plant embodying the features of the invention.

At the extreme left of Fig. 3 are illustrated two groups, 1 and 2, of blocks, each block intended to represent a complement of telephone repeaters whose tube filaments normally receive power from the commercial power service 10 shown at the upper left corner of Fig. 1. The five repeater complements of group 1 are designated $R^1$, $R^2$, $R^3$, $R^4$ and $R^5$ while those of group 2 are designated $2R^1$, $2R^2$, $2R^3$, $2R^4$ and $2R^5$. Each complement of repeaters receives current from the commercial power service 10 through a current supply set. The repeater complements $R^1$, $R^2$, $R^3$, $R^4$ and $R^5$ are normally connected to their respective current supply sets $CSS^1$, $CSS^2$, $CSS^3$, $CSS^4$ and $CSS^5$ by way of normally made contacts of relays J, H and G, while the repeater complements $2R^1$, $2R^2$, $2R^3$, $2R^4$ and $2R^5$ are normally connected to their respective current supply sets $2CSS^1$, $2CSS^2$, $2CSS^3$, $2CSS^4$ and $2CSS^5$ by way of normally made contacts of relays W, T and S.

The current supply sets $CSS^1$, $2CSS^1$, etc., act as line voltage regulating transformers stepping down the voltage of the source 10 to a value suitable for the satisfactory operation of the repeater filaments. The line voltage of source 10, usually in the neighborhood of 115 volts, in practice would be stepped down to 60 volts by the current supply sets.

A transformer 4 has its primary winding connected across the line L which is associated with the commercial power service 10. The secondary of transformer 4 furnishes the gas-filled tube VI with power by way of alternate contacts of key 5 and resistances 6. This tube is normally energized and is adjusted to drop out when the line voltage falls below 75 per cent of its nominal value of 115 volts. When this occurs, relay Y, included in the anode circuit of tube V1 releases to initiate the transfer of the load from the commercial power service 10 to emergency power sources, as will be described in detail hereinafter.

There are two emergency power sources EMG1 and EMG2 and a standby source EMGS. When the voltage across line L reaches the transfer point, or that value at which the tube V1 becomes deenergized, the emergency power supply EMG1 automatically assumes the load comprising the repeater complements $R^1$, $R^2$, $R^3$, $R^4$ and $R^5$, while the emergency power supply EMG2 automatically takes over the load comprising the repeater complements $2R^1$, $2R^2$, $2R^3$, $2R^4$ and $2R^5$. The emergency power sources are motor-driven generators or converters. Should either converter EMG1 or EMG2 fail to supply voltage to its respective load within a predetermined period of time, the standby converter EMGS automatically takes over the load of the emergency converter that failed. Various alarm features are provided to indicate load transfers, no voltage and other conditions which, upon their occurrence, require such alarm indications.

Having given a brief description of the general operation of the power plant illustrated in the drawings, the following description will be directed to its detailed operation.

The supply line L extends from the commercial power service 10 and has connected thereto two groups of current supply sets. One group comprises sets $CSS^1$, $CSS^2$, $CSS^3$, $CSS^4$ and $CSS^5$ while the other group comprises sets $2CSS^1$, $2CSS^2$, $2CSS^3$, $2CSS^4$ and $2CSS^5$. Only the first set of each group is shown in detail, the others being indicated schematically by blocks. The input terminals of the current supply sets of the first group are connected to the leads 7 which permanently connect to the line L. Similarly, the input terminals of the current supply sets of the second group are connected to the leads 8 which also permanently connect to the line L. For proper operation of the current supply sets a fixed load thereon is required. This is accomplished by adding dummy resistance load to the output terminals of the sets as required. Such dummy resistance loads are shown at $DRL^1$ and $2DRL^1$, respectively, associated with the first current supply set of each group. The dummy resistance loads are so adjusted that approximately 60 watts appear at the terminals.

The output terminals of the current supply set $CSS^1$ are indicated at 24 and 25, the latter being connected directly to the 60-cycle ground bus 26 by way of the conductor 27. The terminal 24 is connected to the alternating current terminal of the repeater complement $R^1$ by way of conductor 23, normally closed contacts 22 of transfer relay G, conductor 21 and its associated fuse on fuse panel FP, and conductor 28. The other terminal of the repeater complement $R^1$ is connected directly to the 60-cycle ground bus 26. Thus, the current traversing line L from source 10 passes through the current supply set $CSS^1$ and to the repeater complement $R^1$ in the circuit just indicated. Similar circuits may be traced from the other current supply sets $CSS^2$, $CSS^3$, $CSS^4$ and $CSS^5$ to their respective loads $R^2$, $R^3$, $R^4$ and $R^5$, these circuits including normally closed contacts 22 of transfer relays J, H and G and the leads 35, 36, 37 and 38. Similar circuits may be traced from the current supply sets $2CSS^1$, $2CSS^2$, $2CSS^3$, $2CSS^4$ and $2CSS^5$ to their respective loads $2R^1$, $2R^2$, $2R^3$, $2R^4$ and $2R^5$, these circuits including the leads 50, 51, 52, 53 and 54 normally made contacts of transfer relays S, T and W and the leads 55, 56, 57, 58 and 59. By virtue of the circuits just traced the commercial power service 10 normally supplies all the repeater complements by way of their respective current supply sets. This condition maintains so long as the voltage of the commercial power service 10 remains above the value at which the tube V1 is adjusted to drop out, or until any one of the current supply sets fails.

Should the voltage of line L fall below 75 per cent of its nominal value, the tube V1 would cease to fire and its anode circuit would open to cause relay Y to release its armature. Relay Y released, opens the circuit to normally energized relay BB. At its innermost lower armature and back contact, relay BB establishes a circuit which includes conductor 13, outer upper armature and back contact of relay C, the filament of alarm signal 14 and grounded battery. The lamp 14 is lighted in this circuit as a power service failure alarm. This lamp signal may be extinguished by operation of the alarm cut-off key 15 which, when operated, establishes an obvious circuit for the energization of relay C. Relay C then functions to open the circuit to lamp signal 14 and to complete an energizing circuit for guard lamp 16.

At its outermost upper armature relay BB removes the short from around upper resistance 6 so that the line voltage of line L must return to a higher value than that at which the tube V1 released, to effect the reoperation of the tube and the consequent resumption of the load by the commercial service. This is done to prevent hunting to and from the emergency converters in case the line voltage hovers about the transfer value.

At its innermost upper armature and back contact relay BB establishes obvious operating circuits for relays F and P, the former of which controls the starting of emergency converter EMG1 and the latter performing the same function with respect to emergency converter EMG2.

Relay B was normally held operated in a circuit which includes grounded battery, winding of relay B, conductor 17, back contacts of relay F, conductor 18, and ground at the front contact and outer lower armature of relay BB. When relay BB retracted its armature and relay F operated as a consequence thereof, the operating circuit for relay B, which is a slow-to-release device, is opened. Thus, after an interval of time relay B restores its armature to open the operating circuit for slow-to-release relay A and also to close a circuit for relay AA, the latter circuit depending upon the release condition of relay C. Should relay AA operate, it closes the alarm circuit AC to bring in alarms at other stations. The purpose of relay A will be indicated presently.

Relay F, operated, completes a circuit extending from grounded battery 19, lower alternate contacts of relay F, winding of relay FC to ground. Relay FC operates in this circuit and at its armatures and front contacts completes a circuit from grounded battery 19, resistance 20, armatures and front contacts of relay FC, armature and shunt field of the motor associated with converter EMG1 to ground. The motor of EMG1 starts to function and drives the generator coupled thereto.

Relay F, operated, also completes obvious operating circuits for load transfer relays J, H and G. With relays J, H and G operated, the leads 21, 35, 36, 37 and 38 which extend from the loads R¹, R², R³, R⁴ and R⁵ are transferred from the leads connecting with the corresponding current supply sets CSS¹, CSS², CSS³, CSS⁴ and CSS⁵ to conductor 31 by way of the contacts 33 of the transfer relays. The lead 31 is connected to the ungrounded terminal of the generator of EMG1 by way of the contacts 32 of relay M. The other terminal of this generator is connected directly to the common ground bus 26 as are also the ground terminals of the repeater complements R¹, R², R³, R⁴ and R⁵. Thus when relay F operates, incident to the voltage failure of the commercial power service, the converter EMG1 is started operating and relays J, H and G function to transfer the load units of group 1 from their respective current supply sets to the generator terminals, whereby the emergency source EMG1 assumes the load.

Relay P, whose operating winding is connected in parallel with the operating winding of relay F, operates simultaneously with relay F and performs the same functions with respect to converter EMG2 and the second group of load units as does relay F in connection with converter EMG1 and the first group of load units. Relay P completes an operating circuit for relay PC which, in turn, connects the motor of the emergency supply EMG2 to battery 40. The motor then functions to drive the generator coupled thereto. Relay P also completes operating circuits for transfer relays W, T and S, which circuits include the outermost normally closed contacts of relay N and the lower pair of contacts of relay P.

Relays W, T and S transfer the leads 55, 56, 57, 58 and 59 extending from the load units 2R¹, 2R², 2R³, 2R⁴ and 2R⁵ from leads 50, 51, 52, 53 and 54, connecting with the current supply sets 2CSS¹, 2CSS², 2CSS³, 2CSS⁴ and 2CSS⁵, to the lead 60 which, by way of the upper normally closed contacts of relay N is connected to the ungrounded terminal of the generator of EMG2. The other terminal of this generator is connected directly to the common ground bus 26 as are also the ground terminals of the load units 2R¹, 2R², 2R³, 2R⁴ and 2R⁵. Thus, when relay P operates incident to the voltage failure of the commercial power service the converter EMG2 is started operating and relays W, T and S operate to transfer the second group of load units to the generator of EMG2.

When relay A restores its armature at the end of its releasing period, the ground connected to the innermost upper armature of relay BB is extended to the first upper armatures of both relays D and R. Relay D, through the medium of rectifier 62 is connected across the terminals of the generator of EMG1 whereas relay R is similarly connected across the terminals of the generator of EMG2 by way of rectifier 88. Thus these relays respond to the voltage generated by the generators with which they are respectively associated. Should both generators function properly, relays D and R would operate before relay A released its armature. However, should either one of the generators fail, its corresponding relay, D or R, would not be operated and when relay A restored its armature a circuit to relay K associated with the standby EMGS would be completed to battery 66. For descriptive purposes it will be assumed that the generator of EMG1 failed to build up sufficient voltage to operate relay D. Relay K would then operate as mentioned above. Relay K causes relay KC to operate which, in turn, connects the motor of standby EMGS to battery 66. The motor starts operating to drive the generator coupled thereto. With relay K operated, relay M operates in a circuit extending from grounded battery 66, lower contacts of relay K, conductor 68, winding of relay M, back contact and outermost armature of relay D to ground. Relay M operated, opens its contacts 32 and closes contacts 70 thus transferring the lead 31 from the ungrounded terminal of the generator of EMG1 to the corresponding terminal of the generator of standby EMGS, it being understood that the other terminal of the standby generator is grounded at 26. Thus, the load units of group 1 are transferred from the emergency supply EMG1 to the standby EMGS.

Had the emergency supply EMG2 failed instead of EMG1, relay N would operate instead of relay M and cause the transfer of the second group of load units 2R¹, 2R², 2R³, 2R⁴ and 2R⁵ from the emergency supply EMG2 to the standby EMGS. It will be observed that the operating circuit for relay N includes the front contact and middle armature of relay D. Hence, relay N cannot operate unless the emergency generator EMG1 is operating properly to effect the operation of relay D. The operating circuit for relay M, however, does not depend, for its completion, on the operation of relay R so that the standby EMGS will always assume the load associated with the emergency supply EMG1 should this supply fail, and will assume the load associated with the emergency supply EMG2 when this supply fails only in the event that the emergency supply EMG1 has not failed. The standby EMGS will not take over both loads at the same time.

When the standby EMGS builds up its voltage, relay NV will operate through rectifier 105 to close, at its two upper armatures, alarm circuits to other stations to indicate that one of the emergency sources EMG1, EMG2 has failed and that the standby EMGS is functioning to supply the load. If the standby does not build up sufficient voltage to operate relay NV, or should either relay G or relay S fail to operate when they should to effect the load transfer to their respective converters, alarm indications of such failures are given. This is accomplished by connecting ground from relay BB, back contact of relay A, innermost armature and back contact of relay D, or inner armature and back contact of relay R, depending on which emergency converter has failed, innermost armature and back contact of relay NV, upper armature and back contact of relay E (Fig. 1), winding of relay DD to grounded battery. Relay DD operates to control the alarms. Failure of relay G or relay S to operate gives an indication of loss of load voltage whether due to loss of battery which operates these relays or failure of the relays themselves since they should be operated during failure of the commercial power source. The alarm circuit is traced from ground at the innermost armature of relay BB, armature and back contact of relay A, lower back contacts of relay G or relay S, upper armature and back contact of relay E, winding of relay DD to grounded battery. Relay DD operates as before to give an alarm over the alarm circuit AC. Each current supply set CSS¹, 2CSS¹, etc., is provided with a voltage responsive relay such as shown at 92 and 99 which are connected to the output terminals of the sets by way of rectifiers such as the rectifiers 106 and 107.

Should a current supply set such as CSS¹, for example, fail to develop the voltage required to hold its relay 82 operated, this relay would restore its armature and connect ground to conductor 93. This ground would be extended to the operating windings of relays F and P by way of the middle armature and front contact of relay BB to cause the operation of these relays. Relays F and P perform the same functions hereinbefore described which result in the transfer of the two groups of load units from their respective current supply sets to their respective emergency sources EMG1 and EMG2. Relays B and A restore their armatures incident to the operation of relay F and perform the functions previously described. As indicated in Fig. 3, the back contacts of the no voltage relays of all the current supply sets are connected to lead 93 so that upon failure of any such set the entire load, comprising the two groups of repeater complements, is transferred from the commercial power service to the emergency converters EMG1 and EMG2.

A test switch for each converter is provided for maintenance reasons to permit operating the converter without transferring the load. Such switches are indicated at TST1, TST2 and TSTS. When these switches are operated the guard lamps 110 and 111 are lighted to guard against attendants leaving the converters running. A normal transfer key NTR provides means for transferring the load to the emergency sources in case it is desired to work on the current supply sets, as in adjusting the dummy resistance loads DRL¹, 2DRL¹, etc.

The current supply set such as shown in the dot-dash enclosure in Fig. 3 does not, of itself, constitute a part of the present invention. As hereinbefore mentioned, this device functions as a regulating step-down transformer which in the present application maintains a substantially constant voltage of approximately 60 volts at its output terminals.

The relay E and associated rectifier 100 are used to control the operation of relay DD to bring in alarm signals upon the failure of fuses associated with the fuse panel FP.

A voltmeter V and associated voltmeter switch VS are used to separately test the voltage at the terminals of each of the current supply sets and also to test the voltage of the emergency and standby converters.

Relay CC is provided for the purpose of giving an alarm in the event of failure of a supply battery to the control relays. In the event of such a failure an alarm type fuse functions in a well-known manner to cause relay CC to operate and operate alarms over the alarm circuit AC.

What is claimed is:

1. In combination, a load normally supplied with power from a commercial power service, a pair of emergency power supplies, means responsive to a failure of said commercial power service for splitting said load into two portions and for automatically connecting each portion of the load to a separate one of said emergency power supplies, a standby power supply, and means effective upon failure of either of said emergency power supplies to supply power to its respective load portion within a predetermined period of time, for transferring the load portion of such emergency power supply to said standby power supply.

2. In combination, a load normally supplied with power from a commercial power service, a pair of emergency power supplies, means responsive to a failure of said commercial power service for splitting said load into two portions and for connecting each portion of the load to a separate one of said emergency power supplies, a standby power supply, means effective upon the failure of either of said emergency power supplies to supply power to its respective load portion within a predetermined period of time, for transferring the load portion of such emergency power supply to said standby power supply, and means effective upon the failure of both said emergency power supplies for transferring only the load portion of a particular one of said emergency power supplies to said standby power supply.

3. In combination, a load comprising a plurality of independent load units, a source of alternating current, an emergency source of power, a current supply set interposed between each of said load units and said source of alternating current for delivering power to each of said load units at a predetermined voltage, means effective upon the failure of any one of the current supply sets to supply its respective load unit for transferring all of said load units from said source of alternating current to said emergency source of power.

4. In combination, a load comprising two sections, each section comprising a plurality of independent load units, a source of alternating current, a pair of emergency power sources, means including a current supply set for each of said load units adapted to deliver power from said source of alternating current to its respective load unit at a predetermined voltage, and means responsive to the failure of any one of the current supply sets associated with the load units of either section for transferring the load units of one section to one of said emergency power sources and the load units of another section to the other of said emergency power sources.

5. In combination, a load comprising two sections, each section comprising a plurality of independent load units, a source of alternating current, a pair of normally idle motor-driven alternators, means including a current supply set for each of said load units adapted to deliver power from said source of alternating current to its respective load unit at a predetermined voltage, means responsive to the failure of any one of the current supply sets associated with the load units of either section for simultaneously rendering both said motor-driven alternators operative and for transferring each of the load sections from said source of alternating current to a separate one of said alternators, a standby source of power, and means effective upon the failure of either of said alternators to assume its respective load section for transferring such load section to said standby source of power.

6. In combination, a load comprising two sections, a regular power supply normally supplying power to both said load sections, a pair of motor-driven generators constituting two emergency power supplies, a normally operated voltage detector connected across said regular power supply and adapted to be deenergized when the voltage of said regular power supply reaches a predetermined low value, means controlled by said voltage detector when deenergized for transferring each of said load sections to a different one of said generators and for causing said generators to function to assume their respective loads, and means for preventing the reoperation of said voltage detector except at a voltage considerably in excess of the said predetermined low value, whereby the possibility of said motor-driven generators hunting, should the voltage of said regular power supply hover about the predetermined low value, is precluded.

7. In combination, a load, a regular power service normally supplying said load with current, a pair of emergency generators, a standby generator, a start relay for said standby generator, means responsive to an abnormal condition of said regular power service for disconnecting said load from said regular power service and simultaneously starting said emergency generators and connecting a portion of said load to one emergency generator and another portion to the other emergency generator, a transfer relay for connecting said one portion of said load to said standby generator, a second transfer relay for connecting said other load portion to said standby generator, said transfer relays being normally operative to connect its corresponding load portion to said standby generator upon failure of its respective emergency generator to supply its respective load portion, and means for preventing both said transfer relays from operating at the same time to connect both load portions to said standby generator, comprising a relay responsive to the voltage output of said first emergency generator, a relay responsive to the voltage output of said second emergency generator, and an operating circuit for said second transfer relay which includes normal contacts of the voltage responsive relay of said second emergency generator, alternate contacts of the voltage responsive relay of said first emergency generator and contacts of the start relay associated with said standby generator, and means responsive to the failure of either of said emergency generators for operating said start relay.

8. In combination, a first load section, a second load section, a regular source of power, switching means normally connecting said first load section to said regular source of power, switching means normally connecting said second load section to said regular source of power, a first emergency power source, a second emergency power source, a standby power source, means responsive to a failure of said regular power source for simultaneously operating both said switching means, means controlled by each said switching means for disconnecting its respective load section from said regular power source and connecting it to a separate one of said emergency power sources, means responsive to the failure of the first emergency power source for transferring its corresponding load section to said standby power source, and means responsive to the failure of the second emergency power source during the operation of said first emergency power source for disconnecting the load section being supplied by said standby power source from said standby power source and for transferring the load of said second emergency power source to said standby source of power.

9. In combination, a load, a second load, a regular source of power normally supplying both said loads with current, an emergency power source for said first load, an emergency power source for said second load, means responsive to an abnormal voltage condition of said regular source of power for transferring said first load from said regular power source to its emergency power source and for transferring said second load from said regular power source to its emergency power source, a standby source of power, means responsive to the failure of either of said emergency power sources for transferring its respective load to said standby source of power, and means responsive to the failure of a particular one of said emergency power sources for preventing the transfer of the load of the other emergency power source to the standby power source in the event of failure of said other emergency power source.

10. In combination, a load, a second load, a power line normally delivering current to both said loads, an emergency power source for said first load, an emergency power source for said second load, a relay associated with said first emergency power source and subject to the voltage thereof, a relay associated with said second emergency power source and subject to the voltage thereof, a normally operated voltage responsive device connected across said line, a time delay device controlled by said voltage responsive device, said voltage responsive device functioning upon the occurrence of an abnormal voltage condition on said line for transferring each of said loads from said power line to its respective emergency power source and initiating the functioning of said time delay device, a standby source of power, a transfer relay for one of said loads which when operated transfers its respective load to said standby source, and an operating circuit for said transfer relay which depends for its completion upon the operation of said first voltage-subject relay, the release condition of said second voltage-subject relay and the complete functioning of said time delay device, whereby said transfer relay functions to transfer its respective load to said standby power source only when said first emergency power source is functioning and said second emergency power source fails to function within a predetermined period after the occurrence of the abnormal voltage condition on said line.

11. In a power supply system, a main source of alternating current, a first load, a second load, means interconnecting both said loads and said main source whereby both said loads receive power from said main source, a first emergency source of power, a second emergency source of power, means responsive to a failure of said main source for connecting said first load to said first emergency source and said second load to said second emergency source, a standby source of power, and means responsive to the failure of either of said emergency sources for connecting the corresponding load to said standby source.

12. The combination in a power supply system of a load comprising two separate groups of load units, a source of alternating current, switching means for each of said groups of load units normally connecting said groups to said source of alternating current, a first emergency power supply, a second emergency power supply, a voltage responsive device connected across said source of alternating current, and means controlled by said voltage responsive device when the voltage of said source of alternating current reaches a value below a predetermined low value for simultaneously operating the switching means of each of said load unit groups to cause them to disconnect said load unit groups from said source of alternating current, to connect one of said load unit groups to said first emergency power supply and the other of said load unit groups to said second emergency power supply, and to render both said emergency power supplies effective to supply their respective load unit groups.

13. In combination, a two-section load, a regular power service normally supplying current to said load, a first emergency power supply comprising a motor-driven generator, a second emergency power supply comprising a motor-driven generator, a standby power supply comprising a motor-driven generator, means responsive to the failure of said regular power service for initiating the operation of both said emergency motor-driven generators, a transfer relay for one of said load sections, a transfer relay for the other of said load sections, said relays when operated adapted to transfer their corresponding load sections to said standby motor-driven generator, a relay subject to the output voltage of said first emergency motor-driven generator, a relay subject to the output voltage of said second emergency motor-driven generator, a control circuit for said standby motor-driven generator including the winding of a motor-start relay and normal back contacts of each of said voltage-subject relays connected in parallel, whereby the operation of said standby motor-driven generator is initiated should either of said emergency generators fail to develop sufficient voltage to operate its respective voltage-subject relay, an operating circuit for said first transfer relay controlled by said motor-start relay and the voltage-subject relay of said first emergency generator, and an operating circuit for said second transfer relay controlled by said motor-start relay and by both said voltage-subject relays, whereby either one of said transfer relays operates to transfer its corresponding load section to said standby generator should either of said emergency generators fail, and whereby the transfer of both said load sections to said standby generator is prevented should both said emergency generators fail.

HARRY H. SPENCER.